(12) United States Patent
Lemay et al.

(10) Patent No.: US 9,134,730 B2
(45) Date of Patent: Sep. 15, 2015

(54) METHOD OF MANAGING A TURNING MOVEMENT OF AN AIRCRAFT TAXIING ON THE GROUND

(75) Inventors: David Lemay, Chaville (FR); David Frank, Paris (FR); Michel Basset, Heimsbrunn (FR); Yann Chamaillard, Le Bardon (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 691 days.

(21) Appl. No.: 13/099,450

(22) Filed: May 3, 2011

(65) Prior Publication Data
US 2011/0276226 A1    Nov. 10, 2011

(30) Foreign Application Priority Data

May 7, 2010    (FR) ...................................... 10 53599

(51) Int. Cl.
    *A01B 69/00*    (2006.01)
    *B62D 6/00*    (2006.01)
    *B62D 11/00*    (2006.01)
    *B62D 12/00*    (2006.01)
    *B63G 8/20*    (2006.01)
    *B63H 25/04*    (2006.01)
(Continued)

(52) U.S. Cl.
    CPC ............ *G05D 1/0083* (2013.01); *B64C 25/405* (2013.01); *Y02T 50/823* (2013.01)

(58) Field of Classification Search
CPC ....... B60K 28/16; B60T 8/175; B60T 8/1755; B60G 17/0195; B60W 2520/125; B62D 5/0463; B62D 7/159; B62D 6/008; B62D 6/003

USPC ................ 701/41, 91; 244/50, 100 R, 103 R; 180/55, 168, 301, 307, 342; 318/587
See application file for complete search history.

(56) References Cited

U.S. PATENT DOCUMENTS 3,711,043 A * 1/1973 Cameron-Johnson .......... 244/50
3,757,887 A * 9/1973 Moore et al. .................. 180/168
(Continued)

FOREIGN PATENT DOCUMENTS

WO     2006/078322 A2    7/2006
WO     2007/096646 A1    8/2007

OTHER PUBLICATIONS

French Search Report, FR 1053599, Dec. 15, 2010.

*Primary Examiner* — Redhwan K Mawari
*Assistant Examiner* — Edward Torchinsky
(74) *Attorney, Agent, or Firm* — Sughrue Mion, PLLC

(57) ABSTRACT

The invention relates to a management method for managing a turning movement of an aircraft taxiing on the ground, the aircraft having wheels each fitted with an independent drive device, in which method commands are generated for the independent drive devices so that at least some of those devices contribute to the turning movement. According to the invention, the method comprises the steps of:
    estimating at each instant during the turning movement:
        an instantaneous total power developed by all of the independent drive devices in response to the commands; and
        an instantaneous mean angular acceleration for all of the wheels; and
    adapting the commands to the independent drive devices such that the total instantaneous power developed by all of the independent drive devices is minimized, while conserving the mean angular acceleration.

5 Claims, 1 Drawing Sheet

(51) Int. Cl.
    *G05D 1/00*     (2006.01)
    *G06F 7/00*     (2006.01)
    *G06F 17/00*    (2006.01)
    *G06F 19/00*    (2011.01)
    *B64C 25/40*    (2006.01)

(56) References Cited

U.S. PATENT DOCUMENTS

| | | | | |
|---|---|---|---|---|
| 3,762,670 A | * | 10/1973 | Chillson | 244/50 |
| 3,807,664 A | * | 4/1974 | Kelly et al. | 244/50 |
| 4,089,384 A | * | 5/1978 | Ehrenberg | 180/236 |
| 4,258,579 A | * | 3/1981 | Olbrechts | 74/5.37 |
| 4,303,978 A | * | 12/1981 | Shaw et al. | 701/506 |
| 4,382,234 A | * | 5/1983 | Olbrechts | 331/10 |
| 4,501,138 A | * | 2/1985 | McCandless | 73/114.15 |
| 4,763,260 A | * | 8/1988 | Sakuma et al. | 701/80 |
| 4,995,139 A | * | 2/1991 | Suzuki | 73/116.05 |
| 5,042,752 A | * | 8/1991 | Surauer et al. | 244/164 |
| 5,242,131 A | * | 9/1993 | Watts | 244/103 W |
| 5,418,437 A | * | 5/1995 | Couture et al. | 318/139 |
| 5,513,821 A | * | 5/1996 | Ralph | 244/50 |
| 5,532,929 A | * | 7/1996 | Hattori et al. | 701/110 |
| 5,667,457 A | * | 9/1997 | Kuriyama et al. | 477/156 |
| 5,794,730 A | * | 8/1998 | Kamen | 180/7.1 |
| 6,369,794 B1 | * | 4/2002 | Sakurai et al. | 345/156 |
| 7,502,675 B2 | * | 3/2009 | Hac et al. | 701/38 |
| 7,597,169 B2 | * | 10/2009 | Borroni-Bird et al. | 180/253 |
| 7,681,960 B2 | * | 3/2010 | Wanke et al. | 303/146 |
| 7,758,467 B2 | * | 7/2010 | Ashizawa et al. | 477/5 |
| 7,884,708 B2 | * | 2/2011 | Honkonen et al. | 340/444 |
| 7,987,029 B2 | * | 7/2011 | Takenaka et al. | 701/33.8 |
| 8,024,091 B2 | * | 9/2011 | Takenaka et al. | 701/48 |
| 8,050,822 B2 | * | 11/2011 | Takenaka et al. | 701/41 |
| 8,086,383 B2 | * | 12/2011 | Takenaka et al. | 701/74 |
| 8,116,941 B2 | * | 2/2012 | Ammon et al. | 701/41 |
| 8,131,432 B2 | * | 3/2012 | Senneff et al. | 701/50 |
| 8,135,528 B2 | * | 3/2012 | Takenaka et al. | 701/72 |
| 8,154,426 B2 | * | 4/2012 | Endo et al. | 340/932.2 |
| 8,155,852 B2 | * | 4/2012 | Takenaka et al. | 701/70 |
| 8,160,756 B2 | * | 4/2012 | Villaume et al. | 701/7 |
| 8,271,175 B2 | * | 9/2012 | Takenaka et al. | 701/71 |
| 8,483,926 B2 | * | 7/2013 | Shiozawa et al. | 701/90 |
| 2004/0118622 A1 | * | 6/2004 | Morrell et al. | 180/65.1 |
| 2007/0241935 A1 | * | 10/2007 | Pepitone et al. | 340/958 |
| 2009/0143940 A1 | | 6/2009 | Rhodes et al. | |
| 2009/0218440 A1 | | 9/2009 | Dilmaghani et al. | |
| 2009/0272608 A1 | * | 11/2009 | Bourqui et al. | 188/160 |
| 2011/0178689 A1 | * | 7/2011 | Yasui et al. | 701/70 |

* cited by examiner

METHOD OF MANAGING A TURNING MOVEMENT OF AN AIRCRAFT TAXIING ON THE GROUND

The invention relates to a method of managing a turning movement of an aircraft taxiing on the ground.

It is recalled that an aircraft includes landing gear made up of a plurality of undercarriages and serving to provide an interface between the aircraft and the ground.

TECHNOLOGICAL BACKGROUND OF THE INVENTION

Usually, an aircraft taxies on the ground using drive from its thrusters. Thus, while the aircraft is taxiing on the ground, the wheels of the landing gear of the aircraft turn by freewheeling. Recently, aircraft manufacturers have been giving consideration to applying independent drive devices so as to drive some of the wheels and thus enable an aircraft to taxi on the ground without assistance from its thrusters. The landing gear wheels fitted with such devices therefore do not freewheel, but instead turn at a speed of rotation that is set by the motor of the independent drive device associated therewith, and regardless of the type of movement that the aircraft is performing on the ground.

During a turning movement on the ground, a dynamic constraint comes into play: the wheels need to turn at different speeds of rotation depending on how far away they are from the instantaneous turning center of the aircraft. When the wheels are freewheeling, this dynamic constraint does not raise a problem. In contrast, when the wheels are driven in rotation by means of independent drive devices, this dynamic constraint needs to be taken into consideration so that the independent drive devices drive the wheels to rotate at appropriate speeds.

Proposals have thus been made to calculate the appropriate speed of rotation for each wheel fitted with an independent drive device on the basis of the following relationship, giving the difference between the speeds of rotation of two wheels regardless of whether or not they are fitted with independent drive devices, while an aircraft is performing a turning movement:

$$\Delta \dot{\omega}_{i-j} = \frac{l_{i-j}}{R_{wheel}} \dot{\varphi}_{airplane}$$

where:

$\Delta \dot{\omega}_{i-j}$ is the difference between the speeds of rotation of a wheel number i and a wheel number j;

$l_{i-j}$ is the distance between wheel number i and wheel number j;

$\dot{\varphi}_{airplane}$ is the turning rate of the aircraft; and $R_{wheel}$ is the rolling radius of the two wheels numbers i and j (assuming that each of the wheels i and j has the same rolling radius).

It should be recalled that for a wheel, the rolling radius is the notional radius obtained by the ratio of a speed in translation of the wheel in a horizontal direction divided by the speed of rotation of the wheel.

Nevertheless, the rolling radius turns out to be complex to determine since it depends on numerous factors such as the structure of the tire of the wheel, tire wear, tire inflation pressure, . . . . A wrongly estimated rolling radius for a wheel leads to a wrong estimate for the appropriate speed of rotation for that wheel. The corresponding independent drive device thus imparts an unsuitable speed to the wheel, thereby giving rise to high levels of mechanical stress in the undercarriage that includes the independent drive device: this leads to accelerated wear of the tire and of the undercarriage and possibly also to damaging the undercarriage.

Furthermore, the independent drive device is more heavily loaded, thereby increasing the total instantaneous power developed by all of the independent drive devices. This gives rise to an increase in the power consumption of the independent drive device and to a reduction in the efficiency of the independent drive device.

OBJECT OF THE INVENTION

An object of the invention is to provide a method of managing a turning movement of an aircraft taxiing on the ground that makes it possible to generate setpoints for the independent drive devices that lead to the wheels having speeds of rotation that are compatible with the turning movement.

BRIEF SUMMARY OF THE INVENTION

In order to achieve this object, the invention proposes a management method for managing a turning movement of an aircraft taxiing on the ground, the aircraft having wheels each fitted with an independent drive device, in which method commands are generated for the independent drive devices so that at least some of those devices contribute to the turning movement.

According to the invention, the method comprises the steps of:

estimating at each instant during the turning movement:
an instantaneous total power developed by all of the independent drive devices in response to the commands; and
an instantaneous mean angular acceleration for all of the wheels; and
adapting the commands to the independent drive devices such that the total instantaneous power developed by all of the independent drive devices is minimized, while conserving the mean angular acceleration.

The method makes it possible to adapt the commands without it being necessary to estimate any wheel rolling radius. The total power is estimated very simply, e.g. by observing the torque delivered by each of the devices, the power supply current drawn by each of the devices, . . . . As for the mean angular acceleration, this is obtained very simply by averaging the angular accelerations of all of the wheels in question.

BRIEF DESCRIPTION OF THE DRAWING

The invention can be better understood in the light of the following description of a particular, non-limiting embodiment of the invention given with reference to the accompanying figures, in which.

DETAILED DESCRIPTION OF THE INVENTION

Figure 1:
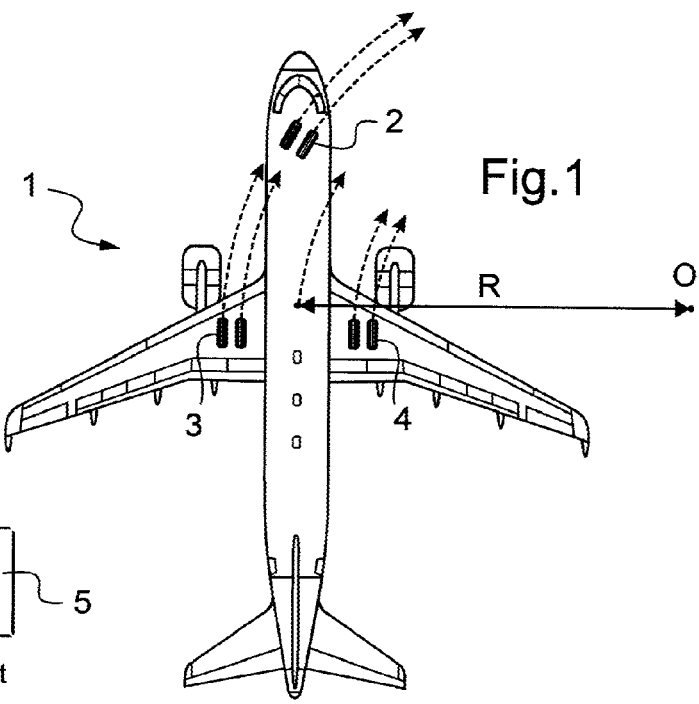
FIG. 1 is a diagrammatic plan view of an airplane on which the invention is implemented.

With reference to FIG. 1, the method of the invention is described herein with reference to an aircraft 1 having landing gear comprising a nose undercarriage 2 at the front of the aircraft and two main undercarriages 3, 4 located respectively to the right and to the left of the fuselage. Each undercarriage 2, 3, 4 in this example has two wheels, with all of the wheels being fitted with respective independent drive devices. Since independent drive devices are well known in the prior art, they are not described in greater detail. It is merely recalled that they comprise respective motors for driving the wheels.

When the aircraft 1 performs a turning movement on the ground, each wheel follows a different path on the ground depending on its distance from the instantaneous turning center of the aircraft 1. Each wheel therefore needs to adopt a speed of rotation that is different depending on the path it follows so that the aircraft 1 performs the desired turning movement without overloading the undercarriages 2, 3, and 4.

In the example shown, the turning movement is a substantially circular turn of radius R having an instantaneous center of rotation O. The further the wheel is away from the instantaneous center of rotation O, the greater the distance it needs to travel and thus the faster it needs to rotate.

Figure 2:
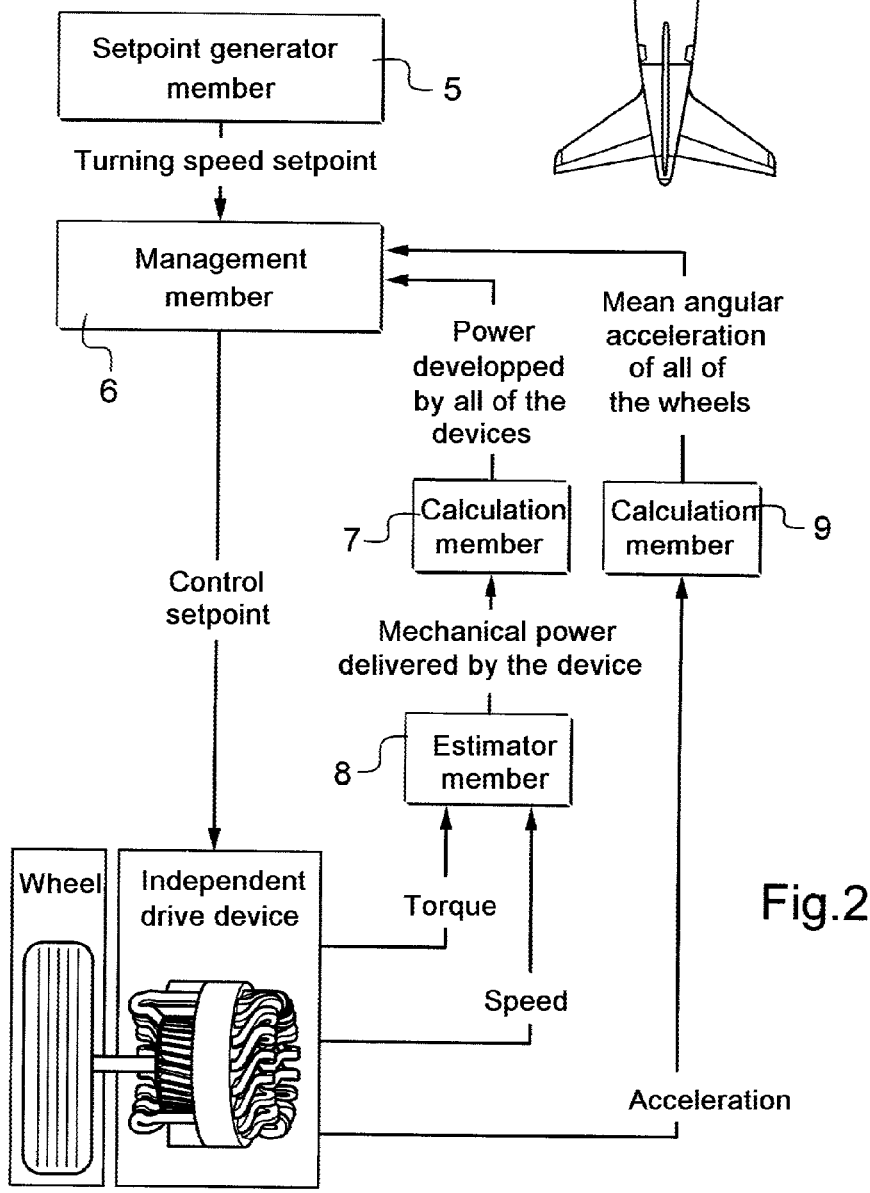
FIG. 2 is a diagram showing the implementation of a portion of the method of the invention.

With reference to FIG. 2, in the invention, the aircraft 1 has a setpoint generator member 5 for generating a turning speed setpoint for the aircraft 1. The setpoint generator member 5 is connected to a management member 6 that generates commands for each of the independent drive devices. The commands are generated so that together the independent drive devices respond to the turning speed setpoint for the aircraft 1 in such a manner that each independent drive device contributes to the turning movement by driving the wheel with which it is associated at an appropriate speed of rotation.

For this purpose, the management member 6 is connected to a first calculation member 7 that acts at each instant of the turning movement to estimate an instantaneous power to be developed by all of the independent drive devices in response to the commands. In a preferred embodiment, an estimator member 8 is associated with each independent drive device of the aircraft 1 so as to act at all instants during a turning movement of the aircraft 1 to estimate an instantaneous mechanical power for delivery by said independent drive device to the wheel with which it is associated. For this purpose, the estimator member 8 receives from the independent drive device information about the instantaneous speed of rotation of the wheel and the instantaneous mechanical torque being delivered to the wheel. The first calculation member 7 thus receives from the estimator member 8 information about the mechanical power delivered by an independent drive device to the wheel with which it is associated, and it deduces therefrom the instantaneous power developed by all of the independent drive devices.

The management member 6 is also connected to a second calculation member 9 that acts at each instant of the turning movement to estimate a mean instant angular acceleration for all of the wheels, the second calculation member 9 receiving, at each instant during a turning movement, and from each independent drive device, instantaneous angular acceleration information concerning the associated wheel.

On the basis of the information concerning the instantaneous total power developed by all of the independent drive devices and on the basis of the mean angular acceleration information for all of the wheels, the management member 6 adapts the commands to the independent drive devices in such a manner that the total instantaneous power developed by all of the independent drive devices is minimized, while conserving the mean angular acceleration. The method may also be expressed by the following optimization problem:

$$\min P_{tot} = \sum_{i=1}^{N} C_i \cdot \dot{\omega}_i$$

under the constraint $$\bar{\dot{\omega}} = \frac{1}{N} \sum_{i=1}^{N} \dot{\omega}_i = \text{constant}$$

where:

$P_{tot}$ is the cost criterion representing the total instantaneous power developed by all of the independent drive devices;

N is the number of wheels taken into account in the criterion;

$C_i$ is the mechanical torque delivered to wheel number i;

$\dot{\omega}_i$ is the angular acceleration of wheel number i; and $\bar{\dot{\omega}}$ is the mean angular acceleration for the rotation of all of the wheels.

Naturally, the invention is not limited to the implementations described and variant implementations may be applied thereto without going beyond the ambit of the invention as defined by the claims.

In particular, although it is said that the total instantaneous power delivered by all of the independent drive devices is estimated from the mechanical power and more precisely from the mechanical torque delivered by each independent drive device to the wheel with which it is associated, it is possible to express the instantaneous total power by other means. In particular, knowing the voltage across the terminals of each of the independent drive devices, and by determining the electric current consumed by each independent drive device, it is possible to estimate the power consumed by each independent drive device in order to rotate the wheel with which it is associated. This enables the instantaneous total power to be estimated.

Although it is stated that the landing gear comprises a front nose undercarriage 2 and two rear main undercarriages 3 and 4, the landing gear could naturally have some other configuration. In addition, the landing gear could have some other number of undercarriages, and each undercarriage could have some other number of wheels. It is possible for only some of the wheels of the landing gear to be fitted with respective independent drive devices.

What is claimed is:

1. A management method for managing a turning movement of an aircraft taxiing on the ground, the aircraft having wheels each fitted with an independent drive device, in which method commands are generated for the independent drive devices by a management member so that at least some of those devices contribute to the turning movement, wherein the method comprises the steps of:

estimating at each instant during the turning movement:
by a calculation member, an instantaneous total power developed by all of the independent drive devices in response to the method commands; and
by a calculation member, an instantaneous mean angular acceleration for all of the wheels; and adapting the commands to the independent drive devices by the management member such that the total instantaneous power developed by all of the independent drive devices is minimized, while conserving the mean angular acceleration.

2. The management method according to claim 1, wherein the instantaneous total power is estimated from a mechanical power delivered by each of the independent drive device to the wheel with which it is associated.

3. The management method according to claim 1, wherein the instantaneous total power is estimated from a mechanical torque delivered by each of the independent drive device to the wheel with which it is associated.

4. The management method according to claim 1, wherein the instantaneous total power is estimated from a power consumed by each of the independent drive device.

5. The management method according to claim 1, wherein the instantaneous total power is estimated from an electric current consumed by each of the independent drive device.

\* \* \* \* \*